Aug. 31, 1965  D. GAWRELUK  3,203,429
AGRICULTURAL IMPLEMENT
Filed April 6, 1964
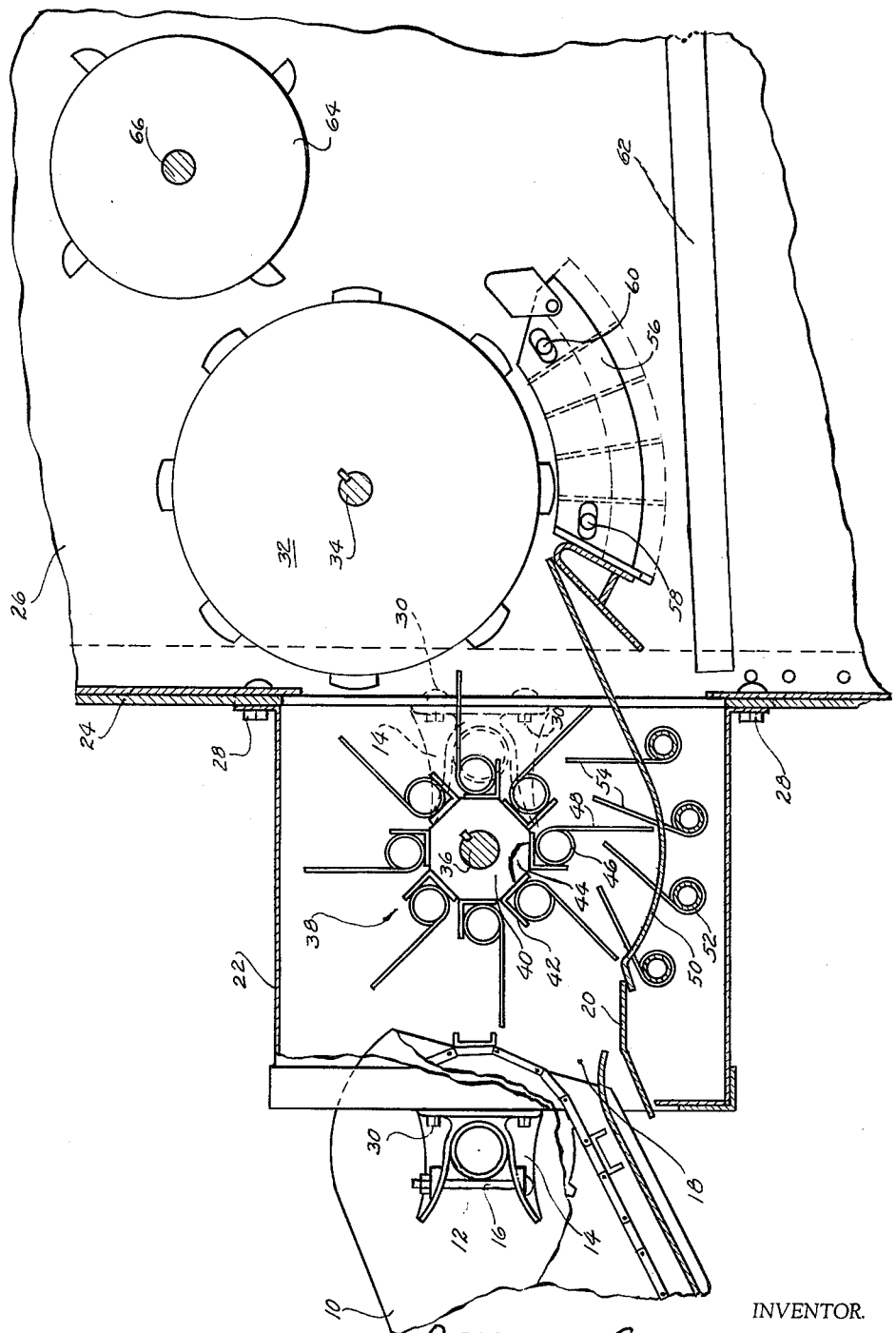
INVENTOR.
DEMETER GAWRELUK
BY
Emerson B Donnell ATTY.
Robert D. Gackstet AGT.

3,203,429
AGRICULTURAL IMPLEMENT
Demeter Gawreluk, Davenport, Iowa, assignor to J. I. Case Company, Racine, Wis., a corporation of Wisconsin
Filed Apr. 6, 1964, Ser. No. 357,519
5 Claims. (Cl. 130—27)

When threshing edible beans with a combine, it is often desirable to replace the regular cylinder and concave with a so-called "spring tooth" cylinder and concave, in which the teeth are much like the teeth of a rake and may be quite flexible and yielding so as not to damage the relatively delicate crop. However, when a combine has been in use for two or three seasons, there is usualy just enough rusting, etc., to make it virtually impossible to remove the regular cylinder in order to make the substitution, and it is highly desirable that some other way be found so that the desired spring tooth cylinder can be used without a prohibitive amount of hard labor and potential damage to the combine, which could easily be inflicted by attempts to remove the regular cylinder. In the present instance, an attachment is provided which will supply the desired spring tooth cylinder and which is easily applied and removed without disturbing the regular cylinder, the latter being easily disabled by moving the concaves a substantial distance away, as is possible by routine adjustment on many modern combines. Under these conditions, the regular cylinder becomes, for the time being, a mere conveyor or beater.

On the other hand, if desired, the regular cylinder may be left in operation to complete the threshing of a crop which is partly threshed by the spring tooth cylinder.

With the above in view, it is the principal object of the invention to provide an attachment including a spring tooth cylinder which can be quickly and easily installed on an existing combine, without disturbing the regular cylinder, and which can take over the duties of the regular cylinder for certain crops, but which can be equally easily removed to restore the combine to its prior state, when crops or conditions dictate.

The manner in which this object is accomplished is fully set forth in the following specification and accompanying drawing, which shows a left side elevation of so much of a combine as necessary for an understanding of the invention, parts being broken away to show what lies beneath.

The invention is concerned with the threshing mechanism only, so most of the rest of the combine has been omitted to avoid unnecessary complication of the drawing, but it is to be understood that all the usual parts essential to the operation of the threshing mechanism are present in the machine. However, since they might conceivably take a number of different forms, and form no part of the present invention, it is not necessary to show or describe them.

As seen in the drawing, a feeder housing or spout 10 has outwardly projecting sleeves as 12, opposed on a horizontal axis and engaged and supported on either side of the feeder spout in forwardly open sockets 14, commonly known as "bull horns." Sleeves 12 are retained in sockets 14 by means of bolts as 16 which extend across the forward openings and prevent inadvertent removal of sleeves 12. Feeder spout 10 is thereby pivotally mounted for swinging up and down in a vertical plane. Suitable well-known mechanism, not necessary to show, is provided for so swinging feeder spout 10.

Feeder spout 10 delivers its cut crop material through a throat portion 18 over a feed plate 20 suitably supported within a detachable housing 22, which is rigidly attached to the front wall 24 of a thresher housing generally designated as 26. Housing 22 may be fastened in any suitable manner which is sufficiently rugged, as for example by bolts 28.

Housing 22 is therefore interposed between thresher housing 26 and feeder spout 10 and may be relatively easily removed and replaced when desired.

When auxiliary housing 22 is not desired, sockets 14 are removed by first removing bolts 30 which hold them in place on auxiliary housing 22 and then installing sockets 14 on front wall 24 using preferably the same bolts 14 which were used for fastening the sockets to housing 22. Feeder spout 10 is then installed by fitting sleeves 12 into sockets 14 as supported on wall 24. Feeder spout 10 then feeds its crop material directly to a cylinder 32 which may be of any appropriate construction within the contemplation of the invention, and which is supported on a shaft 34 carried in suitable bearings not shown, supported in thresher housing 26.

As stated, it is desirable under certain conditions to use a spring tooth cylinder, and such a cylinder is carried on a shaft 36 journaled in suitable bearings, not shown, in housing 22, shafts 34 and 36 and also sleeves 12 being preferably substantially parallel.

Shaft 36 carries a spring tooth cylinder generally designated as 38 of which various forms are known, and which is constituted by a hub portion 40 fixed on shaft 36 and carrying about its periphery a plurality of angular members 42. A similar hub 44 spaced along shaft 36 supports members 42 at their other ends. Angular members 42 have mounted thereon in any suitable or well-known manner, a plurality of axially spaced finger units each having a spring or coil portion 46 and a finger portion 48 projecting in a direction generally parallel to a radius of hub 40, there being a large number of fingers 48, the outer ends of which define a cylindrical space.

Rearwardly of feed plate 20 is a plate 50 downwardly concave and so proportioned as to be closely approached by the tips of fingers 48, as cylinder 38 is rotated. Beneath plate 50 are secured in any suitable manner, a plurality of spring or coil portions 52 of finger units having finger portions 54 which extend generally upwardly through suitable openings in plate 50 to be interposed between the axially spaced fingers 48 on cylinder 38. Cylinder 38 is rotated by suitable or well-known mechanism in a counterclockwise direction as seen in the drawing, and when crop material is presented from feeder spout 10, sliding over feed plate 20, it is promptly engaged by fingers 48 and impelled rearwardly among fingers 54, the resulting jostling being sufficient to dislodge a crop such as edible beans, but without mashing or damaging the crop. It will be apparent that both fingers 48 and fingers 54 are readily yieldable so that they may deflect with very little pressure and avoid any substantial forcible contact with the crop material. The entire mass of crop material is impelled rearwardly or to the right in the drawing, toward the regular cylinder 32.

Cylinder 32 has a concave 56 of well-known form, but carried on transversely disposed rods 58 and 60 and which are adjustable up and down by well-known mechanism fully described in the patent to Bulin, 2,931,363, assigned to applicant's assignee. Other suitable mechanism is contemplated for shifting concave 56.

In the threshing of edible beans or similar tender crops, concave 56 would be adjusted to its lowest possible position, as indicated in dotted lines, so that cylinder 32, although running, would have little or no effect on the crop material passed rearwardly over plate 50, except to assist it in its rearward progress so that it could be further processed by the other elements in the combine, represented by a floor 62 and a beater 64 carried on a shaft 66 journaled in threshing housing 26. The latter parts are well known and need not be described, but are fully disclosed in the assignee's patent to Heth, 2,528,275.

The operation of the device is thought to be clear from the foregoing, but it is pointed out that a spring tooth cylinder, such as 38 is highly desirable for threshing delicate crops such as edible beans, and a common practice has been, when such a crop is to be harvested, to remove cylinder 32 and replace it with a cylinder such as 38. While this might not be considered a major operation, it is true that, after a few seasons of use, it will be found virtually impossible to remove cylinder 32, because of rusting, etc., without the risk of serious damage to the cylinder shaft 34 or housing 26. According to the invention, the same end can be accomplished by merely removing bull horns 14, installing auxiliary housing 22, installing bull horns 14 on housing 22 and replacing feeder spout 10, after which concave 56 is adjusted to its lowermost position. The machine is then fully capable of threshing edible beans without damage.

If other crops must be threshed while the attachment is in place, and for which cylinder 38 would not be sufficiently aggressive, the latter would still convey the material into cylinder 32, and concave 56 would be adjusted in the manner disclosed in above-mentioned Patent No. 2,931,363, so that cylinder 32 would continue the threshing action to the extent required by the crop being harvested.

If a crop is encountered in which the spring tooth cylinder is entirely incompatible, it is a much simpler operation to merely uncouple feeder spout 10, remove housing 22, replace bull horns 14 and recouple feeder spout 10, than it would be under the old practice to remove a spring tooth cylinder from shaft 34 and replace it with a cylinder 32.

A part of the invention is therefore the carrying of an auxiliary cylinder in an auxiliary housing 22 so that it may be relatively easily installed, removed and replaced as often as conditions require.

Variations of the disclosed construction will doubtless occur to those familiar with this art, and the invention is not intended to be taken as limited by the foregoing drawing, or description, nor in fact in any manner except as indicated by the annexed claims.

What is claimed as new and desired to be secured by Letters Patent of the United States is:

1. An attachment for incorporation in a combine of the type including a thresher housing, a threshing cylinder journaled in the thresher housing, said thresher housing providing an opening in a wall thereof through which crop material may be introduced into said thresher housing to said cylinder, a concave supported in said thresher housing and adjustable toward and away from said cylinder, coupling means on said thresher housing adjacent said opening, a header, and a feeder housing leading to said opening, said feeder housing having coupling means engaged with the coupling means on said thresher housing, and an
    auxiliary cylinder housing; means for securing said auxiliary cylinder housing on said thresher housing in registration with said opening when said feeder housing is removed, and coupling means on said auxiliary cylinder housing engageable with the coupling means on said feeder housing for securing said feeder housing on said auxiliary cylinder housing when said auxiliary cylinder housing is in place on said thresher housing so that said auxiliary cylinder housing is interposed between said thresher housing and said feeder housing, and
    auxiliary threshing means in said auxiliary housing positioned to receive crop material from said feeder housing, to thresh said material, and to pass it on to said threshing cylinder.

2. An attachment for incorporation in a combine of the type including a thresher housing, a threshing cylinder journaled in the thresher housing, said thresher housing providing an opening in a wall thereof through which crop material may be introduced into said thresher housing to said cylinder, a concave supported in said thresher housing and adjustable toward and away from said cylinder, coupling means on said thresher housing adjacent said opening, a header, and a feeder housing leading to said opening, said feeder housing having coupling means engaged with the coupling means on said thresher housing, and an
    auxiliary cylinder housing; means for securing said auxiliary cylinder housing on said thresher housing in registration with said opening when said feeder housing is removed, coupling means on said auxiliary cylinder housing engageable with the coupling means on said feeder housing for securing said feeder housing on said auxiliary cylinder housing when said auxiliary cylinder housing is in place on said thresher housing so that said auxiliary cylinder housing is interposed between said thresher housing and said feeder housing, and an
    auxiliary cylinder in said auxiliary cylinder housing, positioned to receive crop material from said feeder housing, to thresh such material, and to pass it on to said threshing cylinder.

3. An attachment for incorporation in a combine of the type including a thresher housing, a threshing cylinder journaled in the thresher housing, said thresher housing providing an opening in a wall thereof through which crop material may be introduced into said thresher housing to said cylinder, a concave supported in said thresher housing and adjustable toward and away from said cylinder, coupling means on said thresher housing adjacent said opening, a header, and a feeder housing leading to said opening, said feeder housing having coupling means engaged with the coupling means on said thresher housing, and an
    auxiliary cylinder housing; means for securing said auxiliary cylinder housing on said thresher housing in registration with said opening when said feeder housing is removed, coupling means on said auxiliary cylinder housing engageable with the coupling means on said feeder housing for securing said feeder housing on said auxiliary cylinder housing when said auxiliary cylinder housing is in place on said thresher housing so that said auxiliary cylinder housing is interposed between said thresher housing and said feeder housing, and a
    spring tooth cylinder in said auxiliary cylinder housing, positioned to receive crop material from said feeder housing, to thresh such material, and to pass it on to said threshing cylinder.

4. An attachment for incorporation in a combine of the type including a thresher housing, a threshing cylinder journaled in the thresher housing, said thresher housing providing an opening in a wall thereof through which crop material may be introduced into said thresher housing to said cylinder, a concave supported in said thresher housing and adjustable toward and away from said cylinder, coupling means on said thresher housing adjacent said opening, a header, and a feeder housing leading to said opening, said feeder housing having coupling means engaged with the coupling means on said thresher housing, and an
    auxiliary cylinder housing; means for securing said auxiliary cylinder housing on said thresher housing in registration with said opening when said feeder housing is removed, coupling means on said auxiliary cylinder housing engageable with the coupling means on said feeder housing for securing said feeder housing on said auxiliary cylinder housing when said auxiliary cylinder housing is in place on said thresher housing so that said auxiliary cylinder housing is interposed between said thresher housing and said feeder housing, a spring tooth cylinder in said auxiliary cylinder housing, and a spring tooth concave in said auxiliary cylinder housing said spring tooth cylinder and said spring tooth concave being positioned to receive crop material from said feeder housing, to thresh such material, and to pass it on to said threshing cylinder.

5. In a combine of the type including a thresher housing, a threshing cylinder journaled in said thresher housing, a concave supported in said thresher housing and adjustable toward and away from said threshing cylinder, the combination of a spring tooth cylinder, a concave supported in position to cooperate with said spring tooth cylinder, said spring tooth cylinder being positioned to transmit threshed crop material to said threshing cylinder, a feeder housing, means in said feeder housing positioned to feed crop material to said spring tooth cylinder, whereby said spring tooth cylinder may be effective when the first-mentioned concave is adjusted away from said threshing cylinder, and both cylinders may be effective when said first-mentioned concave is adjusted toward said cylinder, and said spring tooth cylinder being removable from said thresher housing for said threshing cylinder to become effective alone.

References Cited by the Examiner

UNITED STATES PATENTS 2,804,077   8/57   Anderson _____ 56—400

OTHER REFERENCES

John Deere Operator's Manual, No. OM–H13–957, dated Dec. 23, 1957, pages 92, 93 and 115.

ABRAHAM G. STONE, *Primary Examiner.*

ANTONIO F. GUIDA, *Examiner.*